Patented June 9, 1936

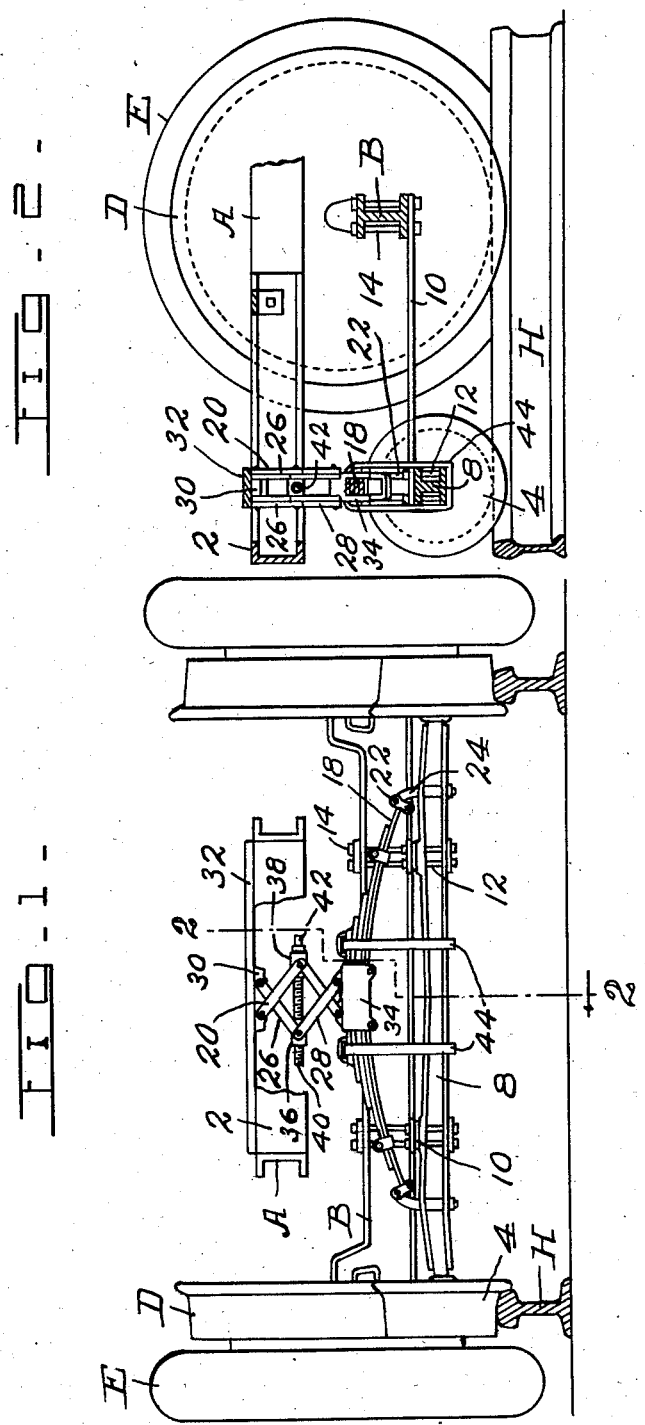

2,043,703

UNITED STATES PATENT OFFICE 2,043,703

VEHICLE GUIDE MEANS

David W. Main, Oklahoma City, Okla.

Application August 29, 1932, Serial No. 630,887

6 Claims. (Cl. 105—215)

My invention relates generally to motor vehicles of the type equipped for both railway and highway travel and more particularly to pilot means for guiding the vehicle while traversing a railway.

The present invention is an improvement over the guiding means disclosed by my copending application filed May 9, 1931, Serial No. 536,207 and the pilot means shown in my copending application, filed March 28, 1932, Serial No. 601,691.

An important object of the present invention is to improve the pilot means shown in my last-mentioned application by providing mechanism whereby any desired proportion of the weight of the vehicle and its load may be transferred in approximately an equal manner to the pilot wheels with a view of reliably holding the latter upon the track and preventing accidental derailment when running over snow, ice or other impedimenta on or beside the rails of the track. A further object is to connect the pilot axle to the adjacent vehicle axle in such manner that while the pilot wheels may be free to move up and down independently of each other and the adjacent vehicle wheels when traveling over irregularities in the surface of the track, said pilot wheels will be held in rigid alinement with said vehicle wheels so that there will be no independent side sway between the former and the latter.

In order that the invention may be fully understood, reference will now be had to the accompanying drawing, in which:

Fig. 1 is a broken front elevation of the vehicle equipped with the pilot means.

Fig. 2 is an irregular vertical section on line 2—2 of Fig. 1.

As the guide means or pilot hereinafter referred to is of substantially the same construction whether applied to one or both ends of the vehicle, in the present instance I have shown it applied to but one end. Referring in detail to the different parts, A designates the frame, B one of the axles and D the flanged wheels of the vehicle. E designates the rubber tires mounted upon said wheels D and an extension frame bolted or otherwise rigidly secured to one end of the frame A. Should two pilots be employed an extension frame 2 will be secured to each end of the frame A.

4 designates a pair of flanged pilot wheels arranged in alinement with that portion of the vehicle wheels D which travel upon the rails H of the track. The wheels 4 are mounted upon the spindles of an axle 8 and preferably arranged close to the wheels D to avoid such undue extension of the wheel base of the vehicle as would render difficult the traversing of curved portions of the track. The axle 8 is held in spaced relation to the axle B by means of a pair of arms 10 which also hold the pilot wheels 4 in alinement with the vehicle wheels D. The arms 10 are firmly secured at their front and rear ends to the axles 8 and B by suitable means such as bolts 12 and 14, respectively.

While the arms 10 are sufficiently rigid to prevent independent lateral movement in a horizontal plane between the pilot wheels 4 and the vehicle wheels D, it is important that they be flexible enough to permit said pilot wheels 4 to accommodate themselves to irregularities in the surface of the track, such, for instance, as exist at railway crossings, switches, and where the end of one rail projects above the end of an abutting rail and raises one of the wheels 4 to a higher plane than its companion, so in order to obtain the necessary flexibility I prefer to make such arms 10 of spring metal.

It is also important to provide means for regulating the pressure of the pilot wheels 4 upon the rails H to prevent accidental derailment and also for raising and holding said pilot wheels in an elevated position, so that the vehicle may travel upon a highway or other surface where it will not be dependent upon the pilot means for guidance. In the present instance I have shown such means in the form of an arched spring 18 and adjusting means 20. The spring 18 is arranged above and longitudinally of the pilot axle 8 to which it is yieldably connected through the intermediary of shackles 22 and hangers 24, as best shown by Fig. 1.

The adjusting means 20 includes two upper pairs of crossed links 26 and two lower pairs of crossed links 28. The upper links 26 are pivotally connected to a block 30 secured to a cross bar 32 forming part of the extension frame 2. The lower links 28 are pivotally connected to a clevis 34 clamped to the intermediate portion of the spring 18. The adjacent ends of one pair of links 26 and one pair of links 28 are pivotally connected to each other and a nut 36, while the adjacent ends of the other two pairs of links 26 and 28 are pivotally connected to each other and a bearing 38 in which a jack screw 40 is rotatably mounted.

The screw 40 is threaded in the nut 36 so that when rotated in one direction it will adjust the links 26 and 28 toward a vertical position and thereby transfer more of the weight of the vehicle upon the pilot in order to reliably hold the wheels 4 in contact with the rails H, and when the screw 40 is rotated in a reverse direction it adjusts the links 26 and 28 towards a horizontal position and thereby relieves the pilot of a proportionate amount of the weight of the vehicle.

By continuing to rotate the screw 40 in the reverse direction the pilot wheels 4 may be raised from the track so that the vehicle may be driven upon a highway. The screw 40 may be manually rotated in either direction upon applying a crank to the rectangular end 42 of said screw, or the latter may be geared to the motor or the transmission mechanism of the vehicle so that the power of said motor may be utilized for raising or lowering the pilot wheels 4. In order to prevent too much lost motion occurring between the axle 8 and the spring 18 when the wheels 4 are being lifted from the track, I provide a pair of loops 44 which extend over said spring 18 and under the axle 8 for the purpose of lifting the latter.

I have found in practice that the flanged wheels D may be dispensed with if desired by substituting wheels with the rubber tires E mounted thereon and arranged to travel directly upon the rails H as well as the highway, as the flanged pilot wheels 4 will act as guides in maintaining the tires E upon the rails H.

While I have shown one form of my invention I reserve all rights to such other forms and modifications thereof as properly fall within the spirit and scope of the invention as claimed.

Having thus described my invention, what I claim and desire to secure by Letters Patent, is:

1. In combination with a vehicle having flanged wheels for traversing a railway track and resilient tires for traversing a highway, pilot means connected to said vehicle and including a pair of flanged wheels adapted to traverse the track and guide the vehicle, an axle upon which said pilot wheels are mounted, spring means extending longitudinally of and connected at its ends to said axle, and adjustable means interposed between the vehicle and the spring means whereby any desired proportion of the weight of the vehicle may be transferred to said spring means.

2. In combination with a vehicle having wheels adapted to traverse railways and highways, pilot means connected to said vehicle to guide the same upon the railways and including an axle, spring means mounted upon said axle, adjustable means connected to the vehicle and the intermediate portion of said spring means and capable of raising and lowering the pilot means, and means depending from said spring means for raising the axle therewith.

3. In combination with a vehicle having wheels adapted to traverse railways and highways, pilot means connected to said vehicle to guide the same upon the railways and including an axle, spring means mounted upon said axle, adjustable means connected to the vehicle and the intermediate portion of said resilient means and capable of raising and lowering the pilot means, and loops depending from said spring means for raising the axle therewith.

4. In combination with a vehicle having wheels for traversing a railway, or highway, a pair of pilot wheels for guiding the vehicle on the railway, an axle upon which said pilot wheels are mounted, resilient means connecting said axle to the vehicle and for holding the pilot wheels in horizontal alinement with the vehicle wheels, spring means extending longitudinally of and connected at its ends to the pilot axle, and adjustable means whereby any desired proportion of the vehicle weight may be transferred to said spring means.

5. In combination with a vehicle having wheels for traversing a railway, or highway, pilot means connected to the vehicle and including an axle and a pair of wheels mounted thereon for guiding the vehicle on the railway, spring means mounted upon the pilot axle, upper links operably connected at their upper terminals to the vehicle, lower links operably connected at their lower ends to said spring means, a bearing to which the upper and lower links are operably connected, a nut to which said upper and lower links are operably connected, and a rotatable screw journaled in said bearing and threaded in said nut for adjusting the links to transfer any desired proportion of the vehicle weight upon the spring means or for raising the pilot means from the railway, or highway.

6. In combination with a vehicle having wheels adapted to traverse railways and highways, pilot means connected to said vehicle to guide the same upon the railways and including an axle, leaf spring means mounted upon said axle, and adjustable means for raising and lowering the pilot means, said adjustable means being connected to the center of the spring means and being independent of the ends of said spring means.

DAVID W. MAIN.